E. HINSELMANN.
COKE OVEN.
APPLICATION FILED JAN. 10, 1914.
1,145,895.
Patented July 13, 1915.
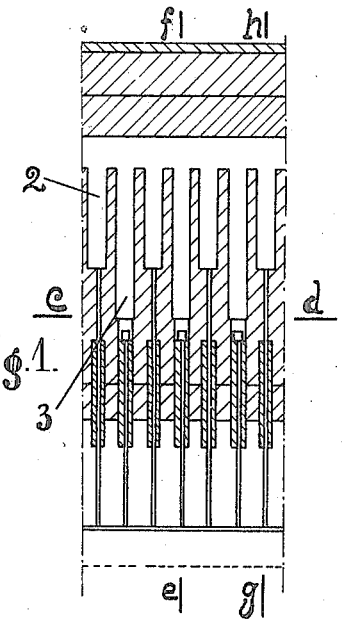
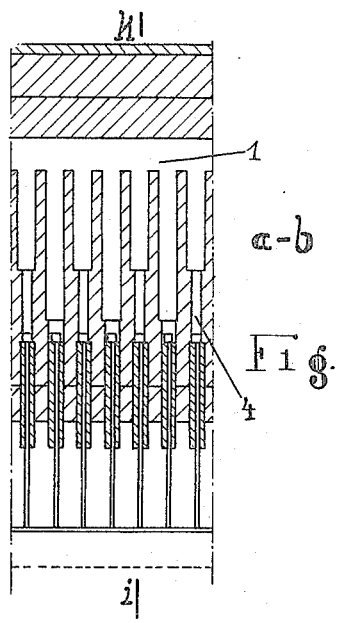
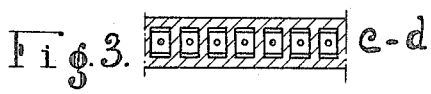
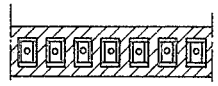
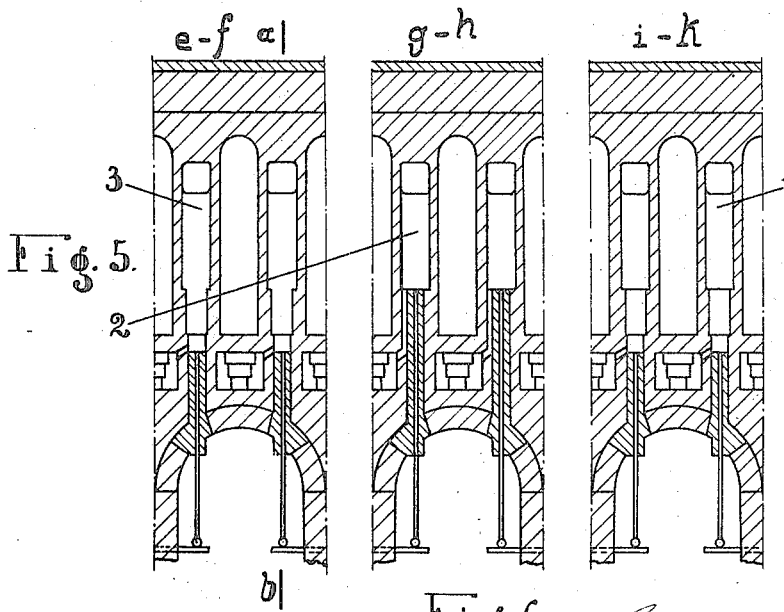
INVENTOR
Ernst Hinselmann
BY
ATTORNEY

UNITED STATES PATENT OFFICE.

ERNST HINSELMANN, OF ESSEN-ON-THE-RUHR, GERMANY.

COKE-OVEN.

1,145,895.　　　　　　Specification of Letters Patent.　　　Patented July 13, 1915.

Application filed January 10, 1914. Serial No. 811,379.

*To all whom it may concern:*

Be it known that I, ERNST HINSELMANN, a citizen of the German Empire, and residing at Essen-on-the-Ruhr, Germany, have invented certain new and useful Improvements in Coke-Ovens, of which the following is a specification.

This invention relates to an improved arrangement of flues for suitably heating tall coke ovens. Such ovens have the defect that the lower parts of the chambers are heated too much and the upper too little. For obviating this defect in such ovens several places or zones of combustion have heretofore been arranged one above another. The arrangement of the heating flues is then complicated, however, and the burners can be kept in order less readily.

According to my invention I obtain uniform heating of the walls of tall coke ovens by beginning the heating flues of one wall not as heretofore at the same height, but at various heights. Thus whereas those places at which combustion takes place in one part of the heating flues are located in the usual manner beside the lower parts of the oven chamber, the places at which combustion takes place in the adjacent heating flues are located higher. In this arrangement an equalization of the temperature takes place, and uniform heating of the walls of the chamber is obtained. The flues used for heating the upper parts of the oven may have a smaller cross-section down to the height of the floor of the chamber. Combustion then begins lower down; the development of flames and severe heating can, however, begin only higher up. In this new arrangement the construction of the oven is considerably stronger than other ovens of the type in question.

One illustrative embodiment of my invention is represented by way of example in the accompanying drawing, wherein:

Figure 1 is a vertical longitudinal section taken through one wall of a heating flue, Fig. 2 is a vertical longitudinal section taken through one wall of the heating flue and showing a modification of the embodiment shown in Fig. 1; Fig. 3 is a cross-section on line *c—d* of Fig. 1; Fig. 4 is a cross-section on the line *a—b* of Fig. 2; Fig. 5 is a cross-section on the line *e—f* of Fig. 1; Fig. 6 is a cross-section on the line *g—h* of Fig. 1; and, Fig. 7 is a cross-section on the line *i—k* of Fig. 2.

Referring to the drawing, the long heating flues 3 alternate with the shorter flues 2 which begin higher up in the heating wall 1. In the right-hand half of Fig. 1 heating flues 4 are shown which begin at the level of the hearth but have the full cross-section requisite for the development of flames only higher up.

As is customary in ovens of this character, the gas and airs are admitted at the common lower level of the flues and ascend upwardly. Due to the fact that the longer and shorter flues alternate in one embodiment or that the constrictions of the flues alternate in the other embodiment, the heating will take place throughout the whole of the oven at different heights, so that uniform heating of the walls of the chamber is obtained.

I am aware that changes can be made in the details of this invention and equivalents substituted therein, without departing from the spirit thereof as defined in the following claims.

I claim:—

1. A coke oven having heating walls containing vertical separate and independent heating flues in which combustion takes place at various heights, said flues beginning at various heights above the bottom of the oven, said flues of various heights alternating throughout said heating walls for the purpose herein described 2. A coke oven having heating walls containing vertical separate and independent heating flues in which combustion takes place at various heights, said flues beginning at various heights above the bottom of the oven, said flues being of various heights throughout the entire heating walls, substantially as described and for the purposes set forth.

3. A coke oven having heating walls containing vertical heating flues supplied with gas and air from a common lower level, combustion taking place at various heights of said flues, said flues beginning at various heights above the bottom of the oven.

4. A coke oven having heating walls containing vertical heating flues in which combustion takes place at various heights, some of said flues having constrictions in the lower parts thereof.

In testimony whereof I affix my signature in the presence of two witnesses.

ERNST HINSELMANN. [L. S.]

Witnesses:
 HELEN NUFER,
 ALBERT NUFER.